US007643564B2

(12) United States Patent  (10) Patent No.: US 7,643,564 B2
Sheynman et al.  (45) Date of Patent: Jan. 5, 2010

(54) METHOD AND APPARATUS FOR RECORDING AND EDITING DIGITAL BROADCAST CONTENT

(75) Inventors: Arnold Sheynman, Northbrook, IL (US); Michael Kotzin, Buffalo Grove, IL (US); Yilin Zhao, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 216 days.

(21) Appl. No.: 10/695,124

(22) Filed: Oct. 28, 2003

(65) Prior Publication Data

US 2005/0091683 A1    Apr. 28, 2005

(51) Int. Cl.
  *H04L 27/00* (2006.01)
  *G06F 13/00* (2006.01)
  *H04N 5/445* (2006.01)
  *H04N 7/173* (2006.01)

(52) U.S. Cl. .................... 375/259; 375/316; 725/38; 725/70; 725/105

(58) Field of Classification Search ............. 375/259, 375/316; 725/4–6, 38, 63, 67, 68, 70, 71, 725/105

See application file for complete search history.

(56) References Cited

U.S. PATENT DOCUMENTS

| | | | | |
|---|---|---|---|---|
| 4,605,973 | A | * | 8/1986 | Von Kohorn ............. 386/54 |
| 5,138,615 | A | | 8/1992 | Lamport et al. |
| 5,189,516 | A | | 2/1993 | Angell et al. |
| 5,436,886 | A | | 7/1995 | McGill |
| 5,544,161 | A | * | 8/1996 | Bigham et al. ........... 370/397 |
| 6,111,858 | A | | 8/2000 | Greaves et al. |
| 6,366,914 | B1 | | 4/2002 | Stern |
| 6,372,974 | B1 | | 4/2002 | Gross et al. |
| 2001/0004417 | A1 | | 6/2001 | Narutoshi et al. |
| 2002/0026479 | A1 | | 2/2002 | Aoki et al. |
| 2002/0055854 | A1 | * | 5/2002 | Kurauchi et al. ............ 705/1 |
| 2002/0057894 | A1 | * | 5/2002 | Ishige ................... 386/46 |

(Continued)

FOREIGN PATENT DOCUMENTS

EP    1309198 A    5/2003

(Continued)

OTHER PUBLICATIONS

Penna, David—Terminal Reference Model, Digital Video Broadcasting, Nov. 19, 2002, Philips Research, 8 pages.

(Continued)

*Primary Examiner*—Young T. Tse
(74) *Attorney, Agent, or Firm*—Vedder Price P.C.

(57) ABSTRACT

A wireless mobile terminal (10) and method for utilizing digital broadcast content records (204) selected digital broadcast content as received, for example, by a digital broadcast receiver (16) and provides editing of the selected digital broadcast content based on digital rights management data to generate customized clips of information. The selected digital broadcast content is edited (206) to produce mobile terminal edited digital broadcast content that may be, for example, distributed (208) by the mobile terminal to a plurality of peer devices. A broadcast content editor (24) allows for the editing of clips of content wherein the edited clips are then stored in memory as recorded clips for distribution by the mobile terminal. In another embodiment, a network element is remotely controlled by the mobile terminal to effect editing through the mobile terminal at the network element.

12 Claims, 8 Drawing Sheets

U.S. PATENT DOCUMENTS

| | | | |
|---|---|---|---|
| 2002/0092024 A1* | 7/2002 | Nagaoka et al. | 725/62 |
| 2002/0114465 A1 | 8/2002 | Shen-Orr et al. | |
| 2002/0146122 A1 | 10/2002 | Vestergaard et al. | |
| 2002/0157002 A1 | 10/2002 | Messerges et al. | |
| 2002/0183059 A1* | 12/2002 | Noreen et al. | 455/427 |
| 2003/0005453 A1* | 1/2003 | Rodriguez et al. | 725/87 |
| 2003/0065802 A1 | 4/2003 | Vitikainen et al. | |
| 2003/0093790 A1* | 5/2003 | Logan et al. | 725/38 |
| 2003/0204850 A1* | 10/2003 | Ng et al. | 725/63 |
| 2004/0031049 A1* | 2/2004 | Suzuki et al. | 725/39 |
| 2004/0128324 A1 | 7/2004 | Sheynman et al. | |
| 2004/0249768 A1 | 12/2004 | Kontio et al. | |

FOREIGN PATENT DOCUMENTS

| | | |
|---|---|---|
| JP | 2001093227 A | 4/2001 |
| WO | WO 01/17255 A1 | 3/2001 |
| WO | WO 02/01879 A2 | 1/2002 |
| WO | WO 2004/061571 A2 | 7/2004 |

OTHER PUBLICATIONS

Martinez, Georges—Interactive Channel Through the General Packet Radio Service (GPRS), Digital Video Broadcasting, Nov. 14, 2002, Motorola Labs, 15 pages.

Rauch, Christian, Kellerer, Wolfgang and Sties, Peter—Hybrid Mobile Interactive Services combining DVB-T and GPRS, Vodafone Pilotentwicklung GmbH, 8 pages.

Wee, Eric Koh Teck—VideoCast, the Wireless Pipe DVB-T Data Broadcasting, infoComm News & Information Network, Jul. 22, 2002, INS Asia,3 pages, www.infocom.org/NewsNetwork/International.

"Digital Rights Management and Superdistribution of Mobile Content", Nokia estimate expressed at 3GSM World Congress, Feb. 2001, 8 pages.

"extensible rights Markup Language (XrML) Example Use Cases 20 Nov. 2001", http://www.xml.org/spec/2001/11/ExampleuseCases.htm, 13 pages.

"Digital Rights Management Version 1.0", Proposed Version Jun. 28, 2002, Open Mobile Alliance, Ltd., 20 pages.

Oren Levine, "Rel Permission Semantics Compared", Nokia Mobile Phones/Mobile Software, Dec. 5, 2002, 4 pages.

Supplementary European Search Report for EP Application No. 04785409.6, pp. 1-3.

Supplementary European Search Report; EP Application No. 04785409.6; dated May 31, 2007; pp. 1-3.

Rauch, Christian et al.; Hybrid Mobile Interactive Services combining DVB-T and GPRS; Proceedings of European Personal and Mobile Communications Conference; Feb. 19, 2001; pp. 1-8.

* cited by examiner

METHOD AND APPARATUS FOR RECORDING AND EDITING DIGITAL BROADCAST CONTENT

CROSS REFERENCE TO RELATED APPLICATION

This application is related to a co-pending application entitled "Digital Content Preview Generation and Distribution Among Peer Devices" filed on Dec. 30, 2002, having Ser. No. 10/331,290, having inventor Sheynman et al., owned by instant assignee and hereby incorporated in its entirety by reference.

FIELD OF THE INVENTION

The invention relates generally to methods and apparatus for receiving and/or communicating digital broadcast content, and more particularly to methods and apparatus for recording digital broadcast content.

BACKGROUND OF THE INVENTION

The transfer of copyright protected digital content in a non-broadcast arena is generally known. Presently, content providers are the only source for content previews, which may usually be transferred freely. Content preview recipients may obtain complete access to the corresponding content and corresponding right from a content server or some other source typically only upon payment of a content license fee. Other content usage control architectures that have been proposed to allow content usage rights to be expressed in vouchers which may be created and distributed separately from the content itself when the content is registered by or with a voucher server. Payment for issued vouchers is collected by a payment collection entity, such as a cellular communication network operator. Registered content previews may be transferred freely among terminals and peer to peer communications and viewed without a voucher, but the content may be fully accessed only upon purchasing a voucher from the payment collection entity.

Consumers are increasingly utilizing non-voice entertainment services through cellular phones and other mobile terminals. Such mobile terminals may include any suitable mobile device that may, for example, communicate wirelessly with suitable networks such as the Internet, intranets, cellular systems, terrestrial digital video broadcast system (DVB-T) or satellite broadcast systems. For example, cell phones have been proposed that include built in digital broadcast content receivers such as DVB-T receivers, cellular transceivers that receive for example GSM-signals, CDMA-signals, or any other signals to facilitate both wideband data stream reception, such as through the DVB-T receiver and lower band reception and communication through the cellular transceiver. These mobile terminals can receive and display (such as play) video and audio streams, digital books, support e-commerce transactions and receive digital television broadcasts.

Such mobile multimedia terminals may include: controllers that switch to the particular receiver according to a communication environment, a display interface to optimize received over the air data signals for display, media decoders to decode received over the air data signals, employ synchronization managers connected to the controller and receivers that enable reception of over the air data signals without re-synchronizing a receiver. Known multimedia mobile terminals may employ memory to store the received digital broadcast content. Such mobile multimedia terminals attempt to manipulate the data signals for display and may combine the broadcast data signal with other data to create a display. However, such mobile multimedia terminals, although apparently allowing the storage of broadcast digital data, do not appear to provide user capability of selecting portions of a digital broadcast to create clips nor recording such clips for sharing content among peer devices without violating copyright protection or other digital rights management limitations. In addition, it does not appear that such terminals facilitate billing for recorded clips or for their distribution. In addition, such mobile multimedia terminals do not appear to allow editing of the digital broadcast content to provide, for example, edited clips that may be shared with other mobile terminals.

In addition, such mobile multimedia terminals typically require the use of a built in digital data broadcast receiver to directly receive the wideband broadcast data stream. It may be desirable to allow cellular phones and other mobile terminals that do not have the built in digital data broadcast receiver, to nonetheless be able to edit digital broadcast content.

In addition, it has been proposed to have mobile terminals that communicate recorded digital information to peer devices while maintaining copyright protection to allow for example a peer device to act as a content provider. However, such devices have not been proposed to include the ability to edit recorded clips of digital content to allow, for example, customized clips to be communicated among peer devices.

In addition, conventional digital rights management techniques typically addresses whether content can be copied but do not typically address whether copied content can also be edited. For example, digital rights that are controlled by a broadcast service provider typically do not control whether a user device may add overlay information, title information, comments, highlighting, splicing, reordering, speed altering and transforming the digital broadcast content (such as adding effects, rotating, filtering, sizing, cropping or other information transformations).

The various aspects, features and advantages of the present invention will become more fully apparent to those having ordinary skill in the art upon careful consideration of the following detailed description of the invention with the accompanying drawings described below.

DETAILED DESCRIPTION OF A PREFERRED EMBODIMENT

Figure 1:
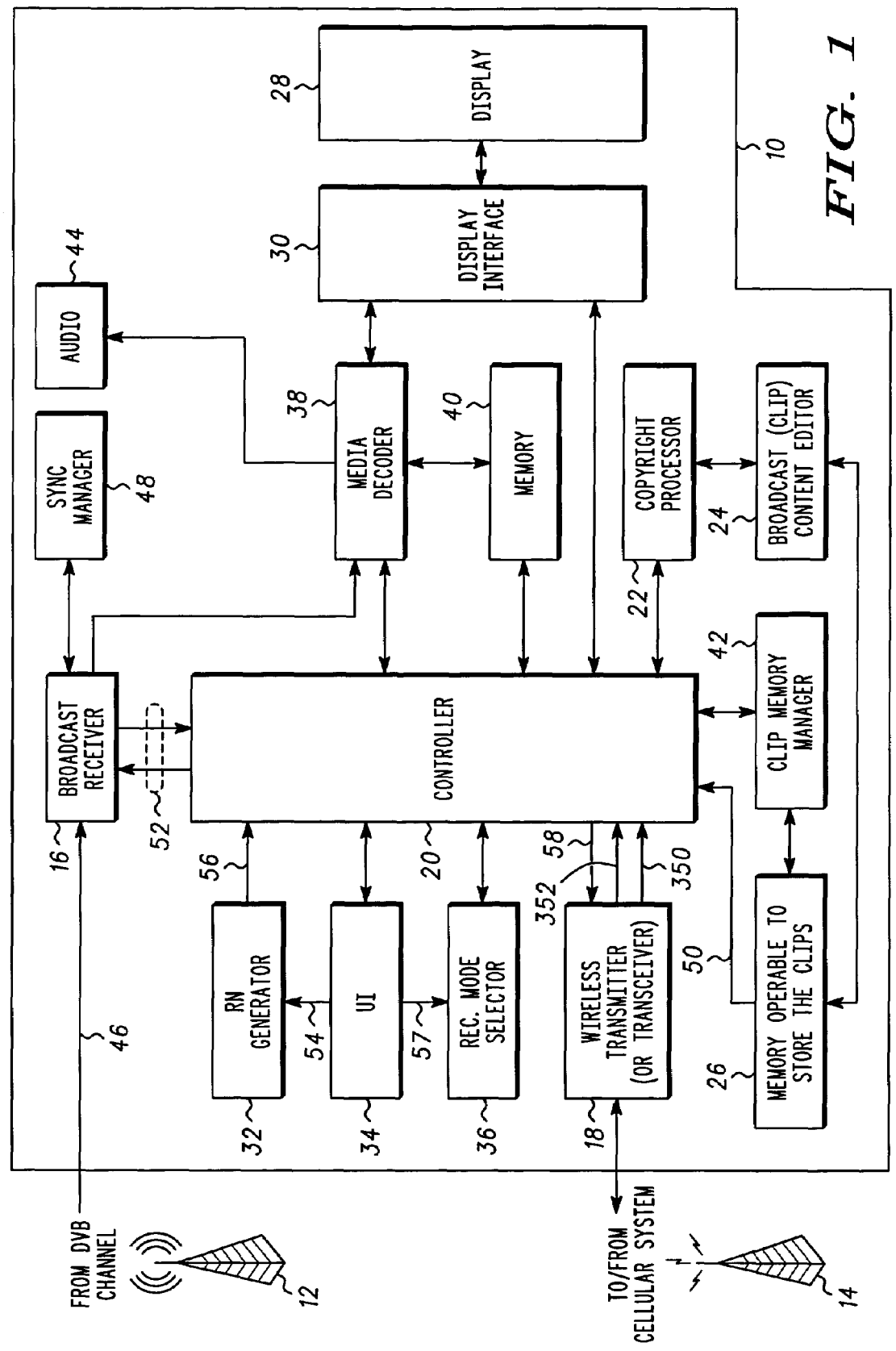
FIG. 1 is a functional block diagram illustrating one example of a mobile terminal in accordance with one embodiment of the invention.

A wireless mobile terminal and method for utilizing digital broadcast content records selected digital broadcast content as received, for example, by a digital broadcast receiver and provides editing of the selected digital broadcast content based on digital rights management data to generate customized clips of information. The selected digital broadcast content is edited to produce mobile terminal edited digital broadcast content that may be, for example, distributed by the mobile terminal to a plurality of peer devices. The digital rights management data may include editing right data and may be embedded in the content as broadcast may be sent later, if desired, by a network element, or may be stored locally in a memory element of the mobile terminal. The edited digital broadcast content (e.g., customized clip) is then distributed wirelessly to peer devices using a wireless transmitter, such as a cellular transmitter, of the mobile terminal. As such, content, such as music files, digital book pages, television clips, with corresponding copyright attributes and editing attributes, if desired, may be edited to provide clips of information to other mobile terminal devices. A clip editor allows for the editing of clips of content wherein the edited clips are then stored in memory as recorded clips for distribution by the mobile terminal.

In another embodiment, a network element is remotely controlled by a mobile terminal to effect editing through the mobile terminal at the network element. Editing broadcast content at the network level allows editing of a higher bandwidth information stream that has been digitally broadcast. For example, the network element converts received digital broadcast content to a lower bandwidth coded information stream and communicates the lower bandwidth coded information stream to the mobile terminal. The mobile terminal receives editing commands by a user, such as through a user interface, to edit the lower bandwidth coded information stream. The mobile terminal sends the editing commands to the network element. The network element receives the editing commands from the mobile terminal and synchronizes editing of the higher bandwidth received digital broadcast content based on the editing commands from the mobile terminal to edit pre-converted digital broadcast content to produce higher bandwidth edited digital broadcast content. The editing is done based on digital rights management data obtained by the network element. As such, in the case where the mobile terminal does not have a digital broadcast receiver, a network element may receive the digital broadcast signal and allow the terminal device to edit the received broadcast stream. This is done as noted above by the network element transcoding or converting the received broadcast stream to a lower bandwidth coded stream that is then provided to the mobile terminal through, for example, a cellular network and received by a cellular receiver in the mobile terminal. Hence, mobile terminals with limited capabilities may be able to accommodate lower quality broadcast streams and may then more efficiently control the recording or broadcast information on the network side. The lower bandwidth coded information stream is synchronized and associated to the higher bandwidth broadcast signal received by the network element. The edited clips may then be stored at the network element or at any other suitable source and a billing system can be notified to bill the mobile terminal for the copying and editing of the various edited clips.

FIG. 1 illustrates one example of a wireless mobile terminal 10 in operative communication with a digital broadcast provider 12 and also in operative communication with another wireless network 14, such as a cellular network. The digital broadcast provider 12 provides a digital broadcast network that may be any suitable broadcast system that broadcasts digital broadcast content (e.g., real time information) over one or more digital broadcast channels. The wireless network 14 may be any suitable wireless network, including but not limited to, a cellular network such as GSM, CDMA, or any other suitable network. In other architectures, the wireless network 14 may be an IEEE802.11 type system, a Blue tooth system, and if desired a wire line system such as the Internet or other network or cable modem connection or any other suitable network.

A mobile terminal 10 may be, for example, a wireless mobile multimedia terminal, or any other suitable wireless device such as a personal digital assistant, laptop computer, cellular telephone, or any other suitable wireless terminal. The wireless mobile terminal 10 includes a broadcast receiver 16 to receive digital broadcast content over a broadcast channel, a wireless transmitter 18 operative to transmit (and receive if desired) information to (and from) the wireless network 14, and a controller 20 operatively coupled to the broadcast receiver 16 and the wireless transmitter 18. As shown, the various blocks represent functional operations of the device and as such, may be implemented in any suitable manner including one or more processors such as microprocessors, DSPs, micro-controllers, state machines, or other devices executing executable instructions or any suitable combination of hardware, software and firm ware as desired. The mobile terminal 10 also includes a copyright processor 22 operatively coupled to the controller 20, a broadcast content editor 24 operatively coupled to the copyright processor and memory 26 operatively coupled to the broadcast content editor 24 and to the controller 20. The broadcast receiver 16 receives digital broadcast content 46 from the digital broadcast content network 12.

The mobile terminal 10 may also include a display 28, display interface 30 to facilitate, output of data on the display 28, a recording notification generator 32, a user interface 34, a recording mode selector 36, a media decoder 38, memory 40, a clip memory manager 42, and an audio output circuit 44. As shown, the functional blocks are suitably coupled by links such as software calls, busses, or any other suitable communication link as known in the art.

In operation, the controller 20 operates to coordinate the broadcast receiver 16 functions and the wireless transmitter 18 functions, for example, to switch the receiver and transmitter operations on and off according to a user's needs. The media decoder 38 suitably decodes received digital broadcast content as received by the broadcast receiver 16 and may notify the controller when a suitable amount of information has been decoded. A display interface 30 receives the decoded broadcast content and suitably displays it on display 28. The synchronization manager 48 suitably synchronizes the broadcast receiver to enable reception of the digital broadcast content without a need to re-synchronize the receiver. For example, as known in the art, a timer may be used to allow the mobile terminal to remain synchronous with the digital broadcast provider when the broadcast receiver is turned off (e.g., the mobile device is web browsing on the Internet).

An audio output circuit 44 suitably outputs audio that is associated with the received digital broadcast content. The memory 40 stores the decoded digital content if desired. The user interface 34 may be a keypad, graphic user interface, or any other suitable user interface as desired. The record notification generator 32, record mode selector 36, clip memory manager 42, copyright processor 22, broadcast content editor 24 and memory 26 are used, in one example, to record and edit clips of received digital broadcast content. The clip memory manager 42 requests that the controller 20 obtain decoded broadcast information from memory 40 to allow real time editing to produce a clip in memory 26.

Figure 2:
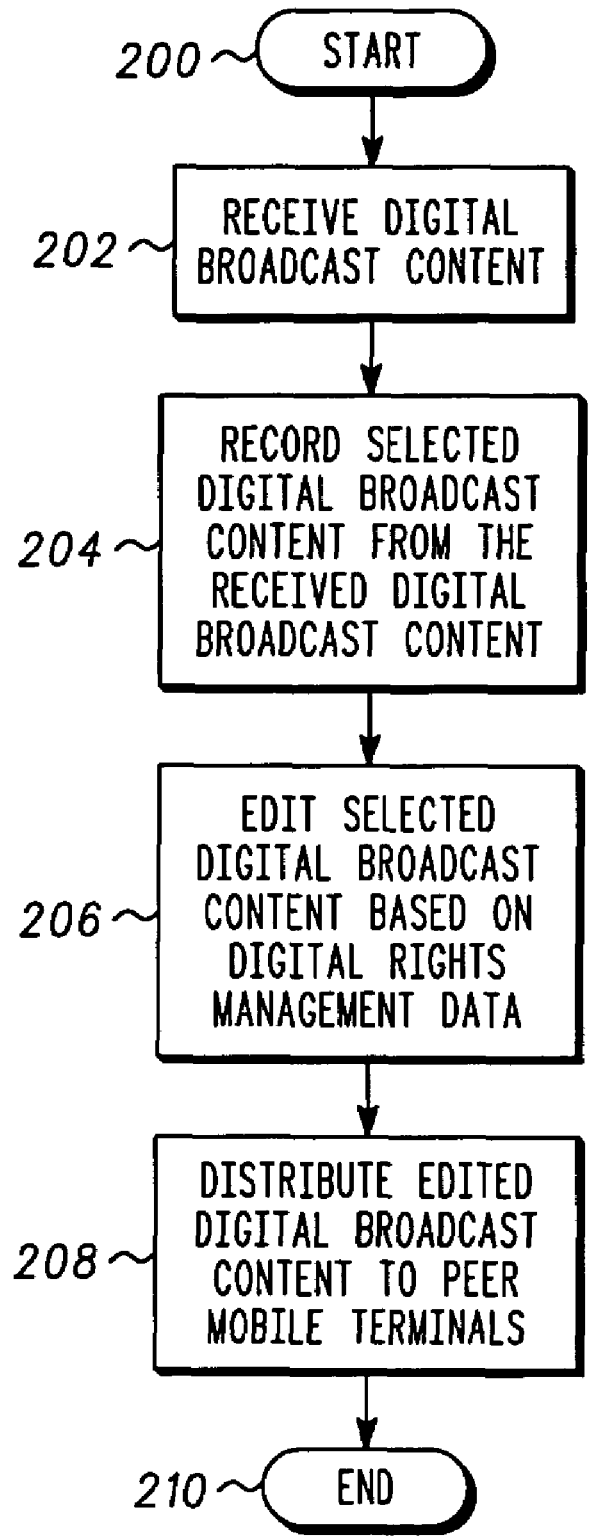
FIG. 2 is a process flow chart illustrating one example of a method for utilizing digital broadcast content in accordance with one embodiment of the invention.

FIG. 2 illustrates one example of a method for utilizing digital broadcast content as performed, for example, by the mobile terminal 10, or any suitable device or combination of devices as desired. In addition, although the method includes various steps, the order of the steps may be manipulated to suit any particular desired operation. As shown in block 200, the method includes a user using the mobile terminal to contact a digital broadcast content provider. As shown in block 202, the method includes wirelessly receiving digital broadcast content 44, such as by broadcast receiver 16. As shown in block 204, the method includes recording selected digital broadcast content from the received digital broadcast content. This may be done, for example, by tagging portions of the incoming digital broadcast content (which is typically real time digital content broadcast to a plurality of different mobile terminals).

The copyright processor 22 may analyze digital rights management data that may be embedded in the digital broadcast content or may be provided later by a network element based upon whether the user is authorized to perform copying, or from any other suitable source. The digital rights management data may be analyzed to determine whether a portion of digital broadcast content can be copied by the mobile terminal. Hence, there may be digital rights management data indicating whether clips can be made from the broadcast content. In addition to copyright management data, the digital rights management data may also include editing right information indicating whether a clip can be edited. As shown in block 206, if the digital rights management data indicates that copying and editing may be performed on the digital broadcast content, the method includes editing selected digital broadcast content to create an edited clip based on the digital rights management data. As shown in block 208, the method includes, if desired, distributing the mobile terminal edited digital broadcast content to a plurality of other mobile terminals using the wireless transmitter 18, based on the digital rights management data, if for example, the digital rights management data indicates whether the clip may be distributed to other mobile peer devices. As shown in block 210, once the edited digital broadcast content is distributed to other peer mobile terminals by the current mobile terminal, the process may be repeated if desired or another operation may be performed by the mobile terminal.

The memory 26 stores the recorded and edited selected digital broadcast content as edited by the broadcast content editor 24 and provides the edited selected digital broadcast content 50 to the controller 20 for output to the wireless transmitter 18. The wireless transmitter sends the edited selected digital content 50 for distribution to the plurality of peer mobile terminals.

Figure 3:
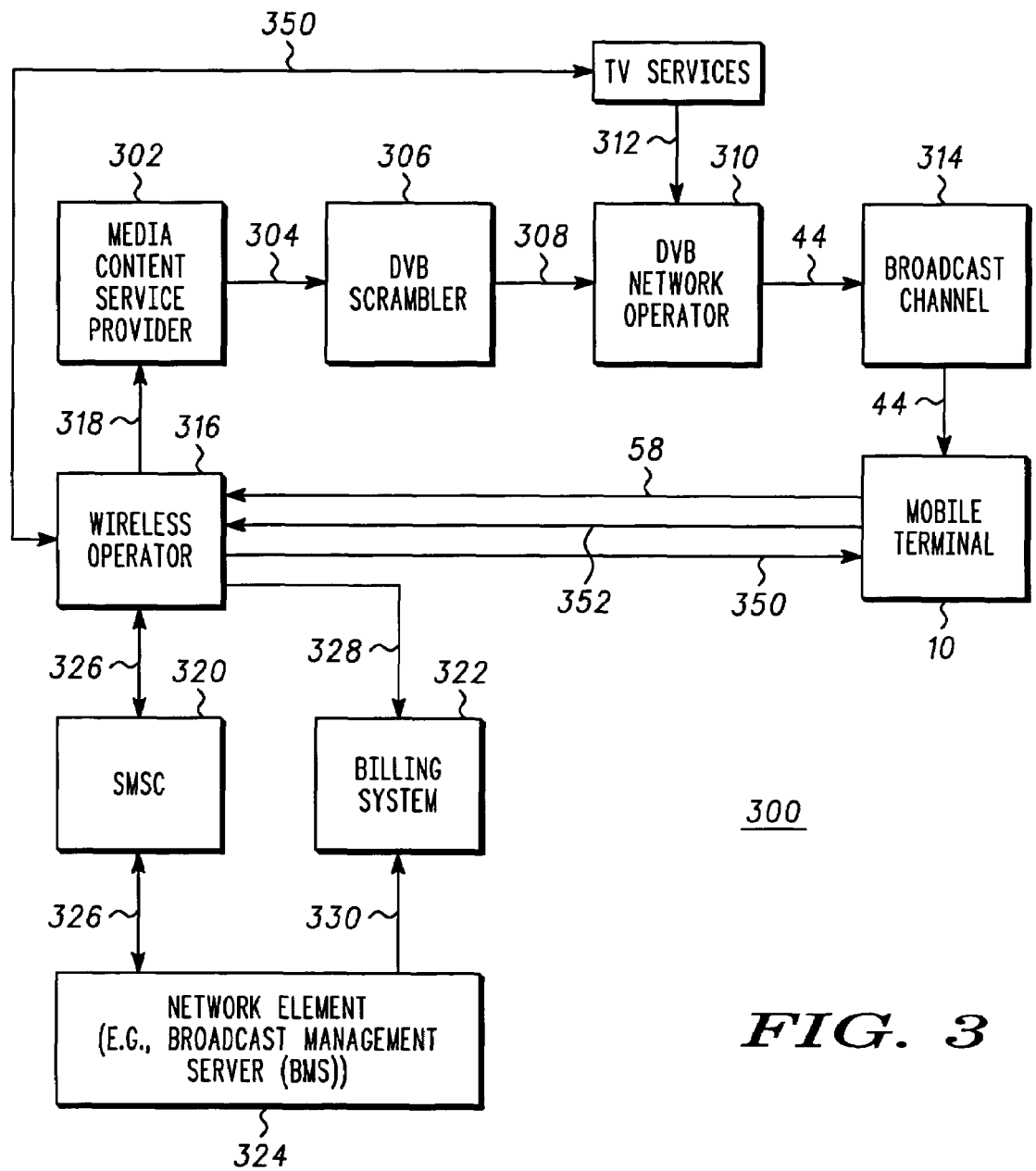
FIG. 3 is a functional block diagram illustrating one example of a network element, such as broadcast management server, that is in operative communication with a mobile terminal device in accordance with one embodiment of the invention.

FIG. 3 illustrates one example of a communication system 300 employing the mobile terminal 10, digital content such as digital audio, movies or any other suitable content may be provided by media content service provider 302 which provides the digital content 304 to a suitable digital video broadcast scrambler 306. The scrambled digital video broadcast content 308 may be provided to a digital video broadcast network operator 310 wherein digital TV content 312 may also be communicated by the digital video broadcast network operator 310. The desired digital broadcast content 44 is then provided over a suitable broadcast channel 314 and broadcast to the mobile terminal along with other mobile terminals. The mobile terminal 10 is also capable of communicating with another wireless system such as a cellular system via the wireless transmitter 18 (or wireless transceiver if desired). As such, a wireless operator 316 (i.e., a wireless network element) communicates information to and from the mobile terminal 110 and also provides billing information, mobile terminal identifier information, or any other information 318 to the media content service provider.

The wireless network operated by the wireless operator 316 may include a short messaging service controller (SMSC) 320, a billing system 322, and a network element such as a broadcast management server 324. The short messaging service controller 320 sends and receives short message service communications 326 to the mobile terminal 10 via the wireless operator 316. The SMS messages may include, for example, edit control information as part of digital rights management information, or other suitable information useful for the broadcast management server and billing system 322. Also the wireless operator 316 may provide billing information 328 to the billing system, such as identification information of the mobile terminal 10, user identification, account information, billing changes, or any other suitable information.

In one embodiment, the network element, such as the broadcast management server 324, receives a recording notification message to begin recording and an end of recording notification message from the mobile terminal through an SMS messaging protocol, for example, and generates, based on the begin recording notification message and the end of recording message, billing information 330 corresponding to an amount of digital broadcast content recorded by the mobile terminal 10. In this way, a mobile terminal or a user thereof may be suitably billed for the amount of content being edited and recorded. Likewise, if peer devices are identified by the mobile terminal that receive recorded clips, these device users may also be billed accordingly based on this identification information. Any other suitable billing information may also be generated as desired. The broadcast management server 324 may maintain the billing and digital rights management functionality if desired. It will be recognized that the controller 20, copyright processor and other functions may be performed by a single device, multiple device, discrete logic, or any other desired structure.

In addition, it will be recognized that in an alternative embodiment, the broadcast management server 324 may include the clip memory manager 42, controller 20, copyright processor 22, memory 26 and broadcast content editor 24, as well as the broadcast receiver 16, instead of the mobile terminal 10 so that the clip editing, clip distribution, and clip recording of the digital broadcast content may be performed on the network side of the system instead of the mobile terminal side. Any other suitable division of operations may also be used as desired.

Figure 4:
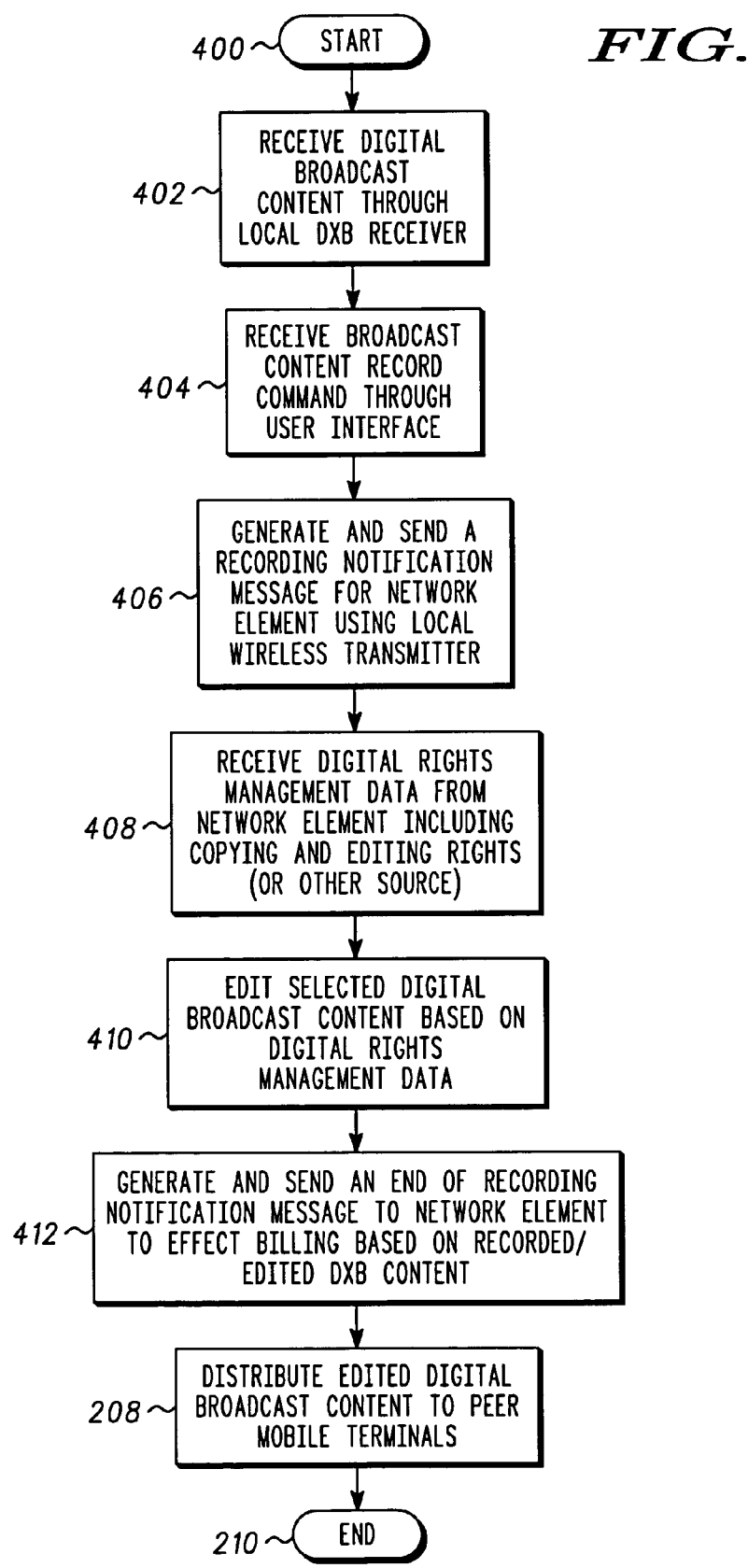
FIG. 4 is a process flow diagram illustrating one example of a method for utilizing digital broadcast content in accordance with one embodiment of the invention.

FIG. 4 is a flow chart illustrating in more detail one example of a method for utilizing digital broadcast content as performed, for example, by the mobile terminal 10, or any other suitable device or combination of devices. As shown in block 400, the method begins for example by a user requesting digital broadcast content. This may include turning on the digital broadcast receiver 16 and as shown on block 402, the method includes receiving digital broadcast content through the local digital or broadcast receiver. While receiving a digital broadcast content, a user may decide to record a part of the broadcast content to create a clip. As such, the user may, for example, press a graphic user interface button of the user interface 34, keypad button or audibly control the recording process through the user interface 34. As such, the controller 20 uses broadcast receiver control signals 52 (see FIG. 1) to suitably control the broadcast receiver 16. In response to a user designating that the user wishes to record content, as shown in block 404, the method includes receiving broadcast content record command 54 through the user interface, such as by the controller 20.

In response to receiving the record command 54 from the keypad, for example, the record notification generator 32 generates a recording notification message 56. As such, activating a recording process on the mobile terminal may include receiving a broadcast content record command through a mobile terminal user interface and generating a recording notification message. The recording notification message 56 may include a recording notification message identifier, a user identification data, begin recording data, a day and/or time stamp or any other suitable information.

In response to the recording command, the controller may perform additional operations. For example, the controller 20 may verify the amount of available memory 26 using the clip memory manager 42 which maintains the amount of available memory 26 for storing recorded and edited clips. The controller 20 may generate a user notification through the user interface 34 to inform the user that the user may store 30 seconds of audio, 15 seconds of video, or may provide any other memory availability feedback information as desired. The controller 20 may also send a user request for the user to select the desired recording mode to select a desired recording format. For example, when the digital broadcast content is a message delivered by a person (for example, a "talking head" graphic and associated audio), it may be sufficient to record only one still image and the voice stream. The choice of format for recording a desired digital broadcast content may significantly reduce the amount of resources (such as memory) required to store the clip. As such, the controller provides the user with a list of recording modes such as one image, multi image, or any other suitable modes. The user then selects the desired mode and this recording made selection 57 is then passed to the record mode selector which then informs the controller which mode has been selected.

Upon receiving a recording mode selection 57, the controller 20 initiates recording of the incoming broadcast content by, for example, instructing the media decoder 38 to store the information in the memory 26 and saves the recording start time and generates a recording notification message 58 for communication to the cellular network via wireless transmitter 18. The record notification message may take any suitable form and may be sent, for example, using an SMS messaging protocol or any other suitable protocol as desired. As such the recording notification message is sent wirelessly to a network element using the wireless transmitter of the mobile terminal. This is shown, for example, in block 406. Upon receiving the recording notification message 58, the SMS controller 320 passes the record notification message to the broadcast management server 324. The broadcast management server 324 performs digital rights management and billing support. For example, the broadcast management server 324 generates the billing record and sends it to the billing system 322 and stores the corresponding digital rights management data and passes it back to the SMS controller 320 for communication as digital rights management data 350 back to the mobile terminal 10. Hence, the SMSC 320 embeds the digital rights management data into an SMS message and sends it back to the mobile terminal 10. As such, as shown in block 408, the mobile terminal receives the digital rights management data 350 from the network element and the digital rights management data 350 may include data representing copying and editing rights. The digital rights management data 350 may be supplied by the TV service provider to the wireless operator for communication to (and storage by) the network element. The digital rights management data 350 may also come from any other suitable source and as such, it may be embedded in the digital broadcast content and may be detected when it is received through broadcast receiver 16, or may come from any other suitable source such as a locally stored digital rights management memory location local to the mobile terminal 10, such as in a SIM card, or any other suitable storage element.

The controller 20 receives the digital rights management data 350 and passes this information to the copyright processor 22 so that the copyright processor 22 can determine copyright and editing rights that may be used by the broadcast content editor 24. The user may enter a stop recording command, for example, by pressing a button which is received as an end of recording message by the controller 20. The controller 20 causes the clip memory manager 42 to stop the recording and saves the recording stop time and sends an end of recording message 352 back to the broadcast management server 324. The end of recording notification message 352 may include the recording notification message identifier, the user identifier, and end of recording time and a day and/or time stamp, or may include any other suitable information as desired.

Upon receiving the end of recording notification message 352, the broadcast management server 324 generates the billing record and sends it to the billing system 322 to indicate the amount of information that has been recorded. The recorded clip can then be edited off line using the broadcast content editor 24 based on the digital rights management data. As such, the broadcast content editor 24 may present user interface to the user to allow the addition of graphic information, text information, or other information to be added to the copied or recorded clip to produce mobile terminal edited digital broadcast content, as shown in block 410. As shown in block 412, the method includes generating and sending an end of recording notification message 352 to the network element to effect billing based on the recorded and edited direct broadcast content. However, it will be recognized is that the order of the steps shown in FIG. 4 may be in any suitable order as desired. As shown in block 208, the method includes distributing the edited digital broadcast content to peer mobile terminals if desired.

The digital rights management data 350 sent to the mobile terminal 10 may include, for example, the number of clip copies allowed to be generated by the mobile terminal, the address of the original content provider, and rules for clip editing. The rules for clip editing may specify, for example, the allowance of audio extraction, color usage, or any other suitable editing information.

In operation, the digital rights management data 350 is analyzed such that a user may select a clip to be shared and edited through the user interface 34. The copyright processor 22 is activated and reads the digital rights management data 350 that may be stored in any suitable memory and evaluates the number of clip copies allowed. If the number of clip copies allowed is greater than 0, the copyright processor 22 reads the rules for clip editing from the digital rights management data 350 and may activate the broadcast content editor 24 by, for example, sending data representing rules for clip editing to the broadcast content editor 24. The broadcast content editor 24 may present UI screens to allow the users to edit the clip. If the number of copies allowed is 0, the clip distribution is not authorized. In addition, if desired, the clip memory manager 42 may then delete the clip from the memory 26.

To make a copy, the broadcast content editor 24 generates a new copy of the clip by accessing the original clip in the clip memory 26 based on rules for clip editing. The broadcast content editor 24 causes the new copy of the edited clip to be stored in the memory 26 and notifies the user through the user interface 34 that the clip copy and editing generation is complete. The distribution of the edited clip is transmitted to peer terminal mobile terminals via the wireless transmitter 58, if desired. The number of copies is decremented by the copyright processor 22 and if no copies are left to be generated, this notification can be sent to the broadcast management server 324 so that the user may be billed and again notified that additional payment may be necessary if more copies are to be distributed. The peer mobile terminals interested in receiving full content may reply with a request and receive the address of the content server address where the information can be purchased since the distributed copy preferably includes the address of the content server.

From the perspective of the broadcast management server 324, the broadcast management server 324 receives the recording notification message 58 and the end of recording notification message 352 from the mobile terminal 10. The broadcast management server 324 generates the billing information corresponding to the amount of digital broadcast content recorded by the mobile terminal. However, it will be recognized that any suitable network element may also perform the operation or that any other suitable device might perform the operation as desired.

The broadcast management server may generate billing information based on determining how many additional mobile terminals receive the mobile terminal edited digital broadcast content from the mobile terminal which information may be sent by the mobile terminal when the edited clips are sent to the various peer mobile terminals. The copyright processor 22 or any other suitable operation may evaluate the device editing rights stored on the mobile terminal to determine whether an editing operation to the selected digital broadcast content is allowed. This data representing the rules for editing, as noted, may be supplied from any suitable source.

Figure 5:
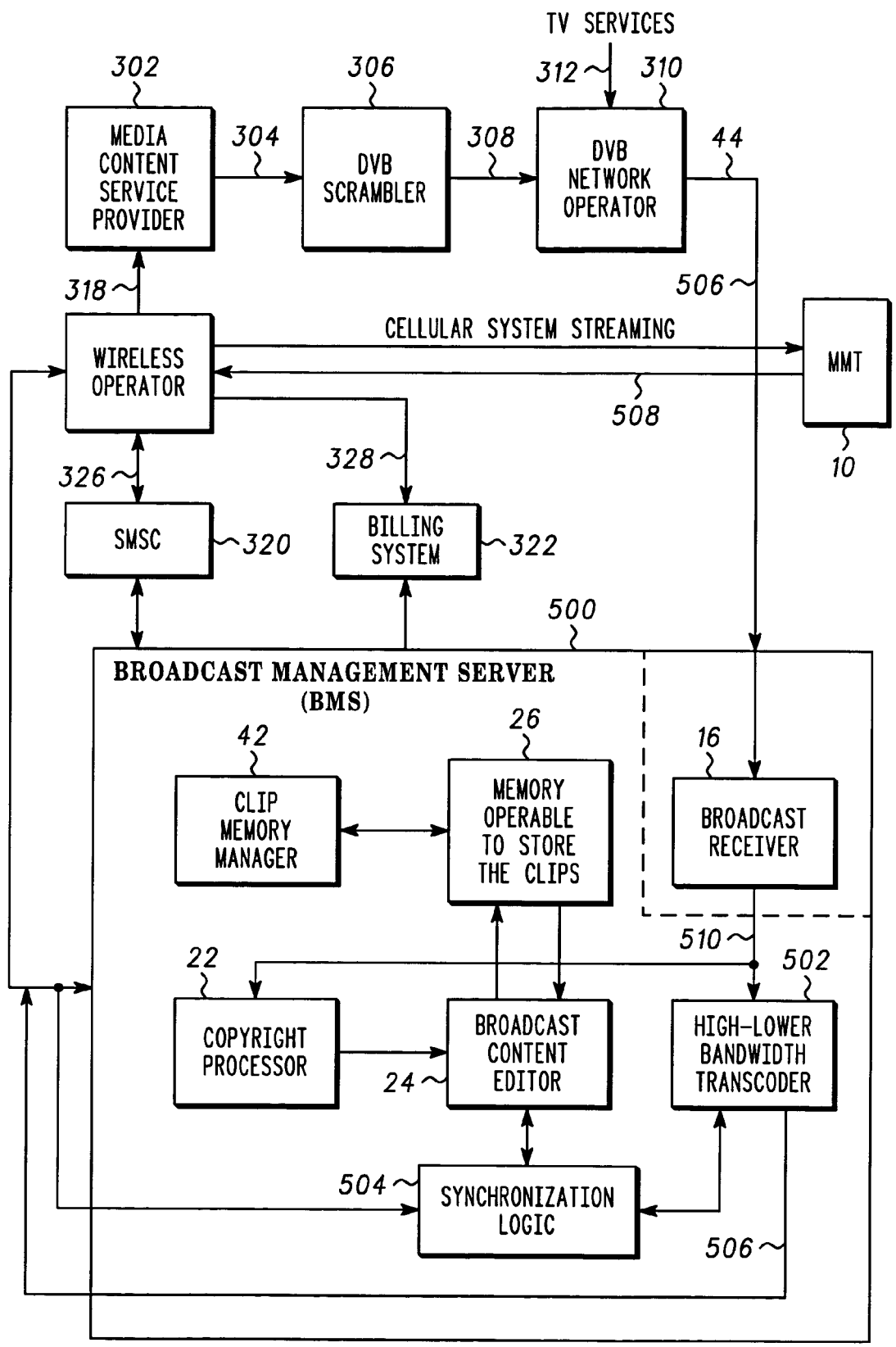
FIG. 5 is a block diagram illustrating an example of a network element for utilizing digital broadcast content in accordance with another embodiment of the invention.

Referring to FIG. 5, in another embodiment, the mobile terminal may not include a broadcast receiver 16. However, a user may still wish to be able to remotely edit digital broadcast content received by the broadcast management server or other device, based on a lower bandwidth representation of the digital broadcast content 44. The broadcast management server may include the broadcast receiver 16, the copyright processor 22, controller (not shown), the broadcast content editor 24, memory 26, the clip memory manager 42, and may include a transcoder 502 such as a high to lower bandwidth transcoder that converts the digital broadcast content 44 to a lower bandwidth coded information stream 506 which is then communicated back to the mobile terminal 10 via a wireless network such as a cellular network or other suitable non-broadcast network. In this example, the broadcast content editor 24 is responsive to editing commands 508 received from the mobile terminal 10 to edit pre-converted (i.e., high bandwidth broadcast content) digital broadcast content 510 to produce the edited digital broadcast content stored in memory 26.

The synchronization logic 504 is operative to synchronize editing of the pre-converted broadcast content 510 based on the editing commands 508 from the mobile. By way of example, the editing commands may be time stamped to coincide with a particular frame or group of frames. Alternatively, frame numbers may be used so that the network element may reconstruct which frame or group of frames needs to be edited.

In this example, the mobile terminal 10 receives a lower bandwidth and coded version of the broadcast information and a higher bandwidth representation is actually edited and stored by the broadcast management server 500 so that high quality copying and editing of digital broadcast content may be managed remotely by the mobile terminal 10. The lower bandwidth coded information stream 506 is synchronized with the pre-converted digital broadcast content 510 using embedded time stamps, if desired, or any other suitable synchronization mechanism.

Figure 6:
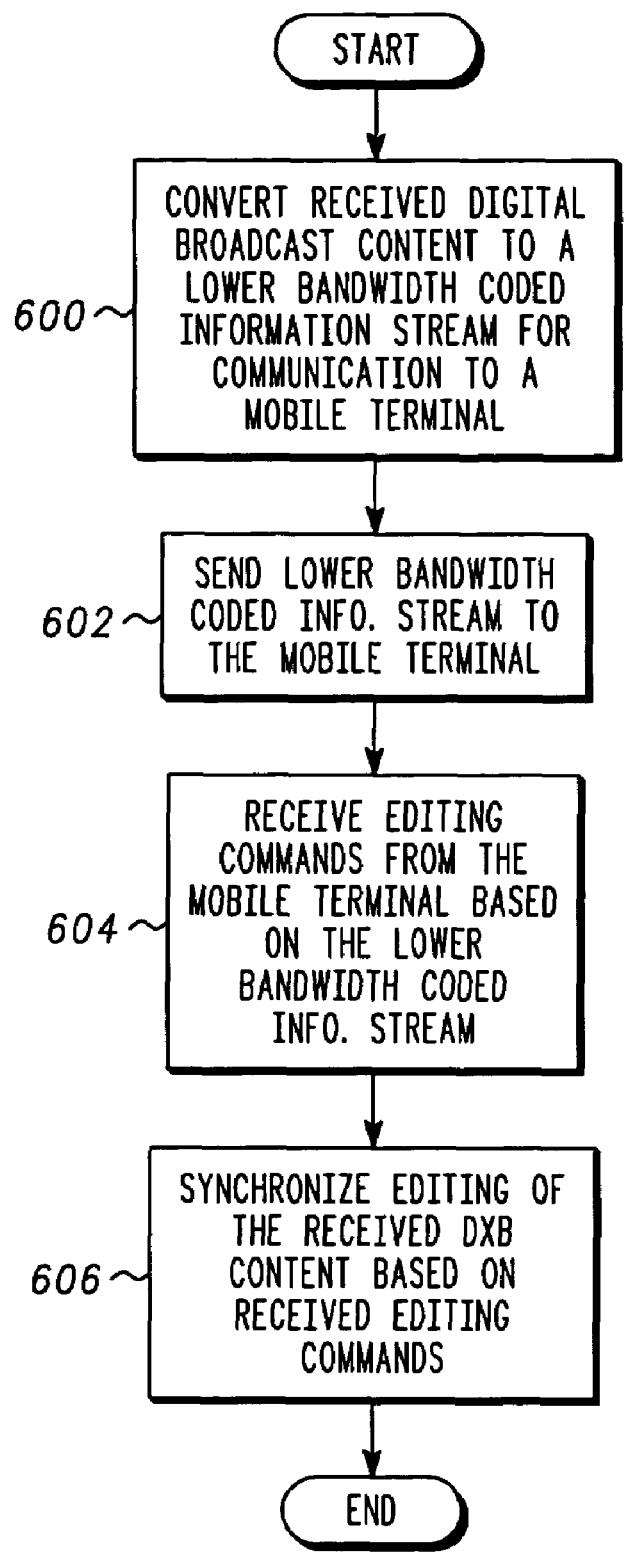
FIG. 6 is a process flow diagram illustrating one example of a method for utilizing digital broadcast content in accordance with one embodiment of the invention.

FIG. 6 illustrates one example of a method for utilizing digital broadcast content that includes converting received digital broadcast content to a lower bandwidth coded information stream for communication to a mobile terminal as shown in block 600. As shown in block 602, the method includes sending the lower bandwidth coded information stream 506 to the mobile terminal 10. As shown in block 604, the method includes receiving editing commands 508 from the mobile terminal 10 based on the lower bandwidth coded information stream 506. For example, the user of mobile terminal 10 is provided with an image generated from the lower bandwidth coded information stream and the user may tag a beginning and end point to be copied. The mobile terminal 10 may also include a broadcast content editor 24, to effect the generation of editing commands 508. The method also includes, as shown in block 606, synchronizing the editing of the received digital broadcast content based on the editing commands to facilitate editing of the pre-converted digital broadcast content, at the network element, to produce higher bandwidth edited general broadcast content, based on digital rights management data. As such, if desired, the digital rights management data is used so that, for example, only content that can be copied is sent to the mobile terminal so that the digital rights management function need not be carried out by the mobile terminal 10. Other advantages will be recognized by those of ordinary skill in the art.

Figure 7:
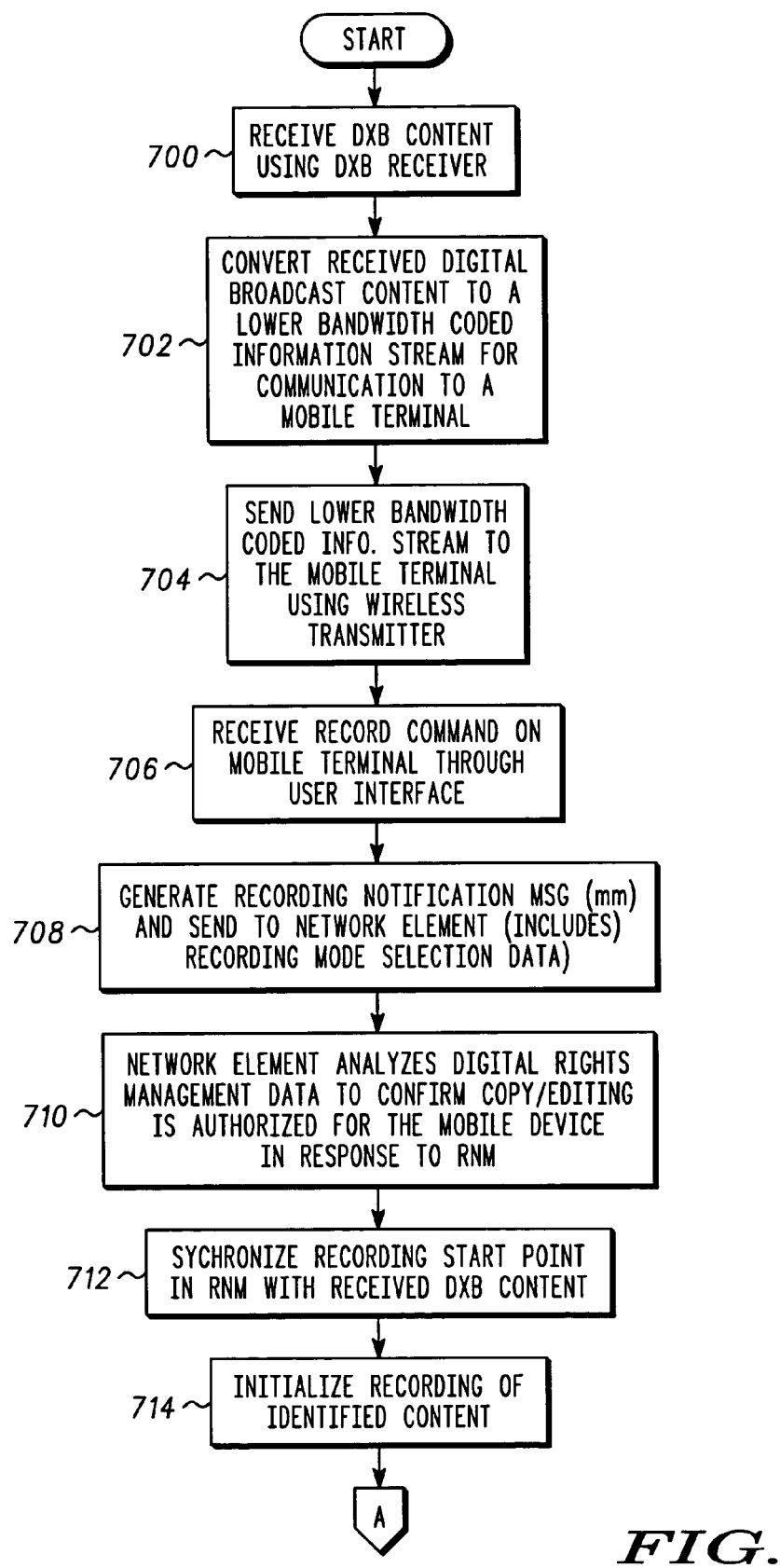
FIGS. 7 and 8 are process flow diagrams illustrating one example of a method for utilizing digital broadcast content in accordance with one embodiment of the invention.
Figure 8:
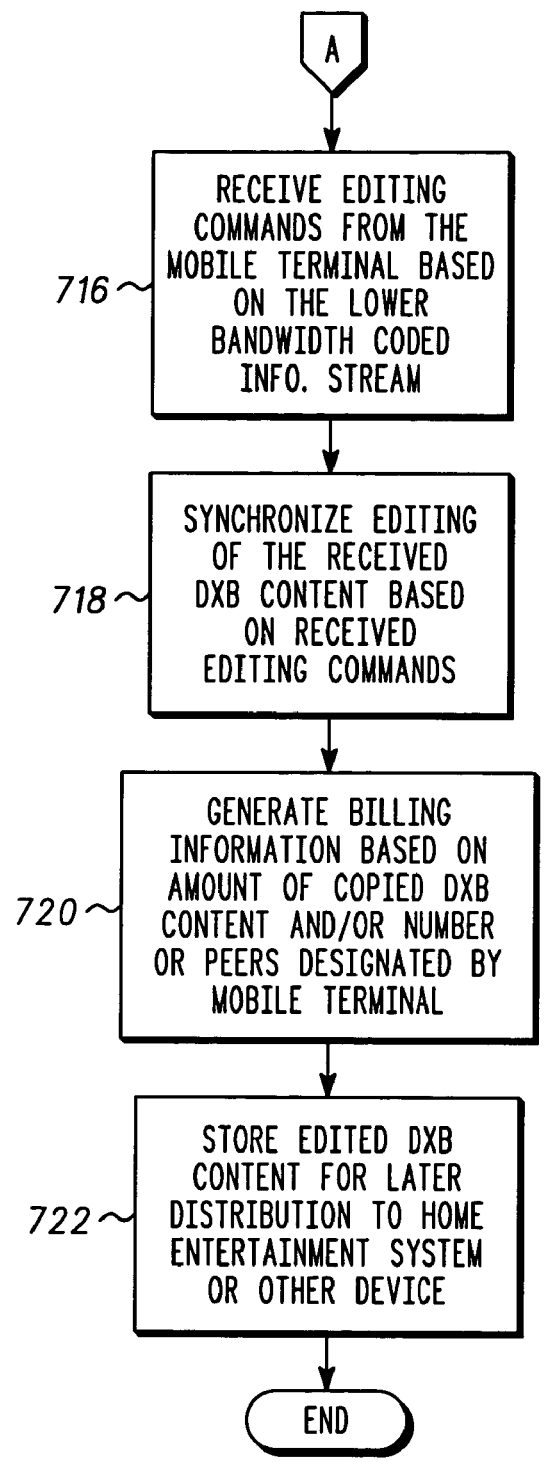

FIGS. 7 and 8 are flow charts illustrating one example of a method for utilizing digital broadcast content to facilitate, for example, remote editing by a mobile terminal. As shown in block 700, the method includes receiving, such as by a network element, digital broadcast content using the digital broadcast receiver 16. As shown in block 702, the method includes converting (such as by using a transcoder) a received (pre-converted) digital broadcast content to a lower bandwidth coded information stream (such as an RTP stream) for communication to the mobile terminal 10. As shown in block 704, the method includes sending the lower bandwidth coded information stream to the mobile terminal over a non-broadcast channel to allow the mobile terminal to receive the broadcast content via a cellular communication channel or other suitable channel.

As shown in block 706, the method includes receiving recording commands 508 through a user interface on the mobile terminal. As shown in block 708, the method includes generating, such as by the mobile terminal, a recording notification message and sending the recording notification message 52 to the network element. The notification message may include, for example, the recording mode selection data 57. As shown in block 710, the method includes analyzing digital rights management data, by the network element, to confirm copying and editing rights authorized for the mobile device in response to receiving the recording notification message 52. As shown in block 712, the method includes synchronizing the recording start point identified in the recording notification message with received digital broadcast content such as the pre-converted digital broadcast content 510. This may be done, for example, by the synchronization object 504. As shown in block 714, the method includes initializing the recording of the identified content by the network element, such that the higher bandwidth representation of the broadcast content is recorded, for example, in memory 26 for later distribution to another device.

As shown in block 716, the method includes receiving editing commands from the mobile terminal based on the lower bandwidth coded information stream that was received by the mobile terminal. As such, the user of the mobile terminal views the displayed lower bandwidth coded information stream corresponding to the received broadcast content by the network element and enters editing commands that are sent to the network element. As shown in block 718, the method includes synchronizing the editing of the received digital broadcast content based on the received editing commands. This may be done, for example, by the synchronization manager in the broadcast management server such that when the editing commands are received from the mobile terminal, they are linked with the corresponding frames of the received digital broadcast content. This may be done, for example, using time-stamped frame numbers or any other suitable technique. As shown in block 720, the method includes generating billing information based on the amount of copy due to broadcast content and/or number of peers designated by the mobile terminal. This may be done by the broadcast management server sending the requisite billing information to the billing system 322. As shown in block 722, the method includes storing, in memory 26, the edited digital broadcast content 510 for later distribution, for example, to a home entertainment system or other mobile terminal device or any other suitable device.

Figure 9:
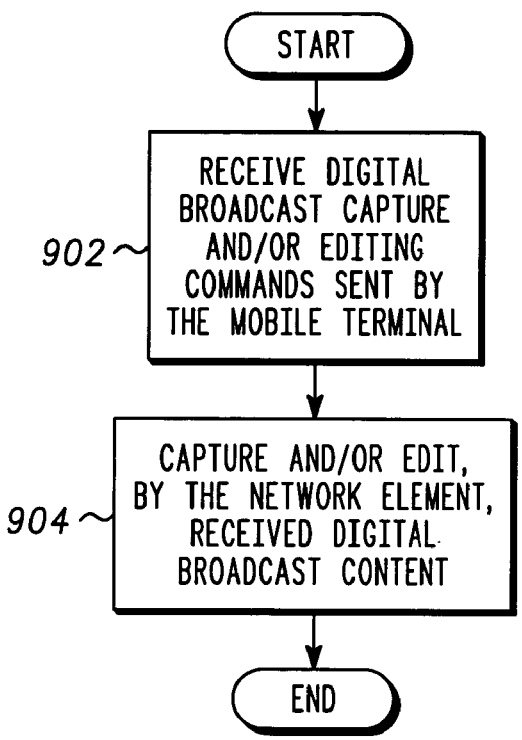
FIG. 9 is a flow chart illustrating one example of a method for utilizing digital broadcast content in accordance with one embodiment of the invention.

FIG. 9 illustrates another method of utilizing digital broadcast content wherein the mobile terminal remotely controls capturing of digital broadcast content in addition to control of remote editing of digital broadcast content by a network element. As shown in block 900, the method includes wirelessly sending at least one of digital broadcast content capture commands and editing commands by a mobile terminal to the network element in a similar manner as described with respect to FIG. 5. As shown in block 902, the network element receives the digital broadcast content capture commands and/or editing commands sent by the mobile terminal. As shown in block 904, the method includes capturing or editing, by the network element, received digital broadcast content, such as the high bandwidth content, based on the received content capture or editing commands. The capturing and or editing is done based on digital rights management data obtained by the network element. As with FIG. 5, the method may include converting the received high bandwidth content to a lower bandwidth coded information stream for communication to the mobile terminal. The network element may then send the lower bandwidth coded information stream to the mobile terminal so that a user may view the lower bandwidth content and use a content capture program or editing program to remotely capture and or edit the high bandwidth content at the network element. As such, the sent digital broadcast content capture commands and editing commands are based on the lower bandwidth coded information stream.

Accordingly, among other advantages, constrained mobile terminals can be used to record and/or edit high bandwidth broadcast information. The synchronized editing facilitates remote control editing of a digital broadcast content using a lower bandwidth stream that may be communicated via a non-broadcast channel to a mobile terminal.

In addition, the above methods and apparatus may provide digital broadcast content editing on a mobile terminal based on digital rights management data. Other advantages will be recognized by those of ordinary skill in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for utilizing digital broadcast content comprising:
   receiving the digital broadcast content by a mobile terminal;
   recording selected digital broadcast content from the received digital broadcast content;
   editing, through the mobile terminal, the selected digital broadcast content to produce mobile terminal edited digital broadcast content, based on digital rights management data; and
   activating a recording process on the mobile terminal by:
   receiving a broadcast content record command through a mobile terminal user interface; and
   generating a recording notification message that includes: a recording notification message identifier, user identification data, begin recording data and a day or time stamp.

2. The method of claim 1 wherein receiving the digital broadcast content includes receiving the digital broadcast content through a digital broadcast receiver of the mobile terminal and wherein the method includes wirelessly sending the recording notification message to a network element using a wireless transmitter of the mobile terminal.

3. The method of claim 2 further comprising receiving, by the network element, the recording notification message and an end of recording notification message from the mobile terminal; generating, based on the recording notification message and the end of recording notification message, billing information corresponding to an amount of digital broadcast content recorded by the mobile terminal.

4. The method of claim 3 wherein generating the billing information is based on determining how many additional mobile terminals received the mobile terminal edited digital broadcast content from the mobile terminal.

5. The method of claim 3 further comprising sending the digital rights management data by the network element to the mobile terminal in response to receiving the recording notification message.

6. A digital broadcast content recording apparatus comprising:
   a transcoder operative to convert digital broadcast content to a lower bandwidth coded information stream for communication to a mobile terminal;

a copyright processor operatively coupled to detect whether the digital broadcast content can be copied based on digital rights management data;

a broadcast content editor operatively coupled to the copyright processor and responsive to editing commands received from the mobile terminal, to edit pre-converted digital broadcast content to produce edited digital broadcast content based on the digital rights management data; and synchronization logic, operatively coupled to the broadcast content editor, and operative to synchronize editing of the pre-converted digital broadcast content based on the editing commands from the mobile terminal.

7. The apparatus of claim 6 further comprising:

a broadcast receiver, operatively coupled to the transcoder, and operative to receive the digital broadcast content; and memory operatively coupled to the broadcast content editor that stores the edited pre-converted digital broadcast content for transmission to another device.

8. The apparatus of claim 6 further comprising control logic operative to generate billing information corresponding to an amount of digital broadcast content recorded in response to a recording notification command received from the mobile terminal.

9. A method for utilizing digital broadcast content comprising:

converting received digital broadcast content to a lower bandwidth coded information stream for communication to a mobile terminal;

sending the lower bandwidth coded information stream to the mobile terminal;

receiving editing commands from the mobile terminal; and synchronizing editing of the received digital broadcast content based on the editing commands from the mobile terminal to edit pre-converted digital broadcast content to produce higher bandwidth edited digital broadcast content based on digital rights management data.

10. The method of claim 9 further comprising:

receiving the lower bandwidth coded information stream, by the mobile terminal;

generating, through a user interface of the mobile terminal, the editing commands based on the received lower bandwidth coded information stream; and sending the editing commands, by the mobile terminal, to a network element to effect remote control of editing of higher bandwidth received digital broadcast content by the network element based on viewing of the lower bandwidth coded information stream from the mobile terminal.

11. A wireless mobile terminal comprising:

a broadcast receiver operative to receive digital broadcast content over a broadcast channel;

a wireless transmitter operative to transmit information;

a controller, operatively coupled to the broadcast receiver and to the wireless transmitter;

a copyright processor operatively coupled to the controller to receive the digital broadcast content;

a broadcast content editor operatively coupled to the copyright processor and operative to edit selected digital broadcast content to produce mobile terminal edited digital broadcast content based on digital rights management data;

memory operatively coupled to the broadcast content editor and to the controller;

a user interface operative to receive a broadcast content record command and operatively coupled to the controller; and wherein the controller generates a recording notification message that includes at least: a recording notification message identifier, user identification data, begin recording data and a day or time stamp and generates an end of recording notification message.

12. A method for utilizing digital broadcast content comprising:

wirelessly sending at least one of digital broadcast content capture commands and editing commands by a mobile terminal;

receiving the at least one of digital broadcast content capture commands and editing commands sent by the mobile terminal;

capturing or editing, by a network element, received digital broadcast content based on the received content capture commands or editing commands;

converting the received digital broadcast content to a lower bandwidth coded information stream for communication to the mobile terminal;

sending the lower bandwidth coded information stream to the mobile terminal; and wherein wirelessly sending the at least one of digital broadcast content capture commands and editing commands is based on the lower bandwidth coded information stream.

* * * * *